United States Patent [19]
Rickards et al.

[11] Patent Number: 5,119,036
[45] Date of Patent: Jun. 2, 1992

[54] ELECTRICAL CAPACITANCE CLEARANCEOMETER

[75] Inventors: Charles Rickards, Cincinnati; Charles E. Hornbeck, West Chester; Norbert J. Hester, Cincinnati, all of Ohio

[73] Assignee: General Electric Company, Cincinnati, Ohio

[21] Appl. No.: 530,051

[22] Filed: May 29, 1990

[51] Int. Cl.⁵ .................. G01P 3/483; G01R 27/26
[52] U.S. Cl. .................................. 324/662; 324/686; 324/690
[58] Field of Search ............. 324/662, 663, 682, 681, 324/661, 671, 668, 667, 690, 686

[56] References Cited

U.S. PATENT DOCUMENTS

| 2,842,738 | 7/1958 | Warnick | 324/61 |
| 3,609,735 | 9/1971 | Dauterman et al. | 324/662 X |
| 3,826,980 | 7/1974 | Deichelmann et al. | 324/690 X |
| 4,063,167 | 12/1977 | Duly | 324/61 R |
| 4,329,644 | 5/1982 | Libertini et al. | 324/160 |
| 4,482,859 | 11/1984 | Fournier | 324/682 X |
| 4,804,905 | 2/1989 | Ding et al. | 324/61 P |
| 4,806,848 | 2/1989 | Demers | 324/61 R |
| 4,813,273 | 3/1989 | Parsons | 73/118.1 |
| 4,818,948 | 4/1989 | Dooley | 324/61 P |
| 4,823,071 | 4/1989 | Ding et al. | 324/662 |

FOREIGN PATENT DOCUMENTS 2071852 9/1981 United Kingdom .

OTHER PUBLICATIONS

Electronics, p. 147, May 1953.

Primary Examiner—Kenneth A. Wieder
Attorney, Agent, or Firm—Jerome C. Squillaro; Bernard E. Shay

[57] ABSTRACT

An electrical capacitance clearanceometer system adapted clearanceometer system to measure the distance between a housing and a moving member within and closely adjacent the housing as a function of electrical capacitance therebetween, utilizes a high temperature probe which contains a high temperature electrical inductor potted in one end and an electrical capacitor electrode in a braze sealed tip at the other end and electrically connected to the inductor. The probe is inserted in a housing to have its capacitor electrode positioned adjacent the moving member. The electrode is braze attached to a ceramic insulator at the end of the probe and the ceramic insulator is brazed to a transition metal sleeve which is then brazed to the probe to fix the insulator in the probe. An air passage is formed between the insulator and the probe body to provide cooling air to the insulator and capacitor electrode. A voltage controlled, continuously variable, high frequency oscillator and a phase detector are connected to the probe to provide an electrical signal proportional to the capacitance and distance between the probe capacitor electrode and the moving member.

10 Claims, 1 Drawing Sheet

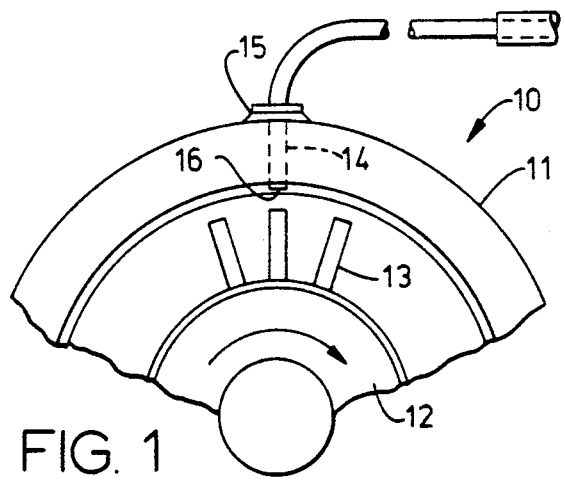
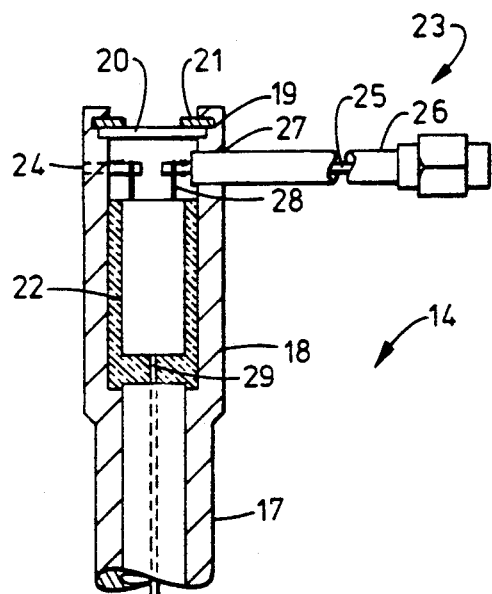
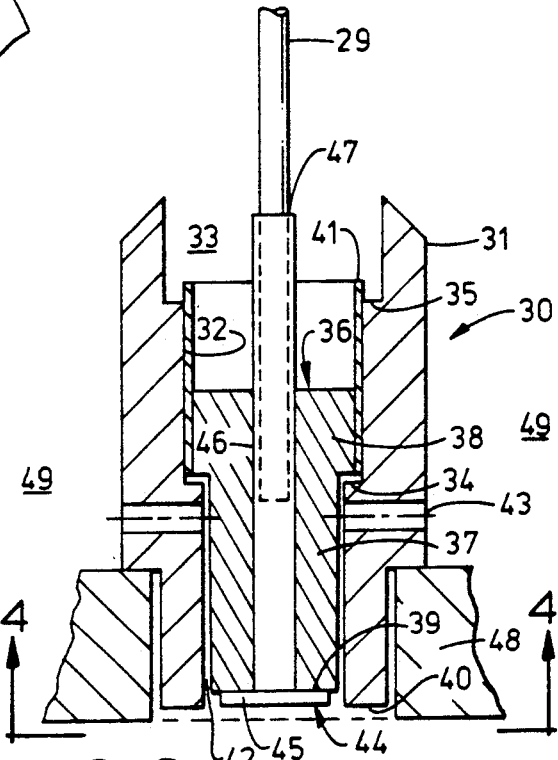
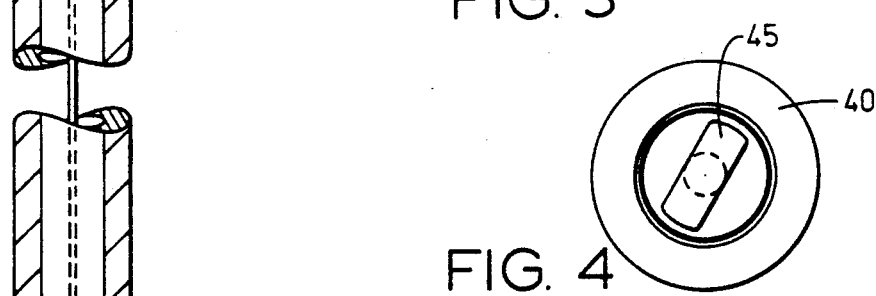
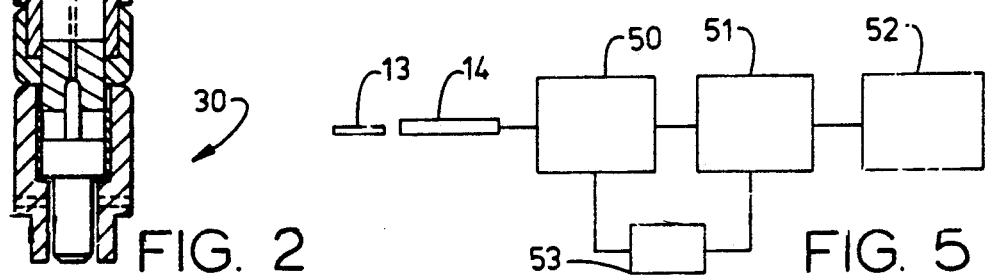
FIG. 1
FIG. 2
FIG. 3
FIG. 4
FIG. 5

ELECTRICAL CAPACITANCE CLEARANCEOMETER

This invention relates to an electrical capacitance clearanceometer, and more particularly to an electrical capacitance measuring system particularly adapted to measure clearance between fixed and adjacent moving parts within a machine as a function of changes in electrical capacitance between the parts.

BACKGROUND OF THE INVENTION

In various rotating machines, a rotor or rotating member is closely confined within a housing or casing and it is imperative that the gap or distance between the casing and the rotating member, referred to as running clearance, be maintained within predetermined limits for safe and effective operation of the machine. One example of such a machine, and one to which this invention is particularly applicable, is a hot gas turbine engine such as an aircraft gas turbine engine. In such an engine, a turbine wheel or rotor having a circumferential row of spaced apart vanes or blades extending therefrom is closely confined within an encircling housing or casing to define a hot gas flow path transversely through the row of blades. Reaction of the blades to the hot gas flow causes rotation of the turbine wheel and appropriate power generation. Any loss of turbine blade reaction from hot gas leakage or bypass through the running clearance space, instead of between turbine blades, represents a potential power loss. Preservation of a minimum clearance gap during engine operation assists in avoiding significant rotational contact of the blades with the encircling casing which may rapidly lead to failure of engine components as well as the engine as an effective power plant. For these reasons, it has become a practice to measure the running clearance of a turbine wheel during its operation and to have a continuous measuring or monitoring system for the running clearance during certain predetermined operations of the turbine. Various operating characteristics of a hot gas turbine engine provide significant difficulties to the use of many known gap and distance measuring devices, particularly those utilizing actual contact with a moving member. For example, the environment of the high speed turbine blades is hostile to measuring devices, reaching extreme temperatures in the range of 1200° F. to 1800° F. In the presence of a hot, contaminating, and corrosive gas stream. This extreme temperature range causes significant differential expansion of various component parts which affects not only any associated measuring means, but also the running clearance gap or distance being measured.

Because of the high speed of the turbine wheel, the described hostile environment, and the openness or spacing of the blades on the rotor, measuring devices or systems requiring contact with the rotor blades have been avoided. With respect to non-contact measuring means, various electrical capacitance systems have been developed to measure the running clearance of hot gas turbine wheels and other bladed wheels or rotors.

In these prior electrical capacitance systems, a probe member with a sensor end thereon is inserted in an appropriate aperture in a turbine rotor housing, for example, so that the sensor end of the probe is exposed to the passing tips of the turbine blades. The sensor end of the probe adjacent the moving blades is fitted with an electrical capacitor electrode which may be positioned in substantially coplanar relationship with the inner surface of the closely confining casing or housing around the turbine wheel. In this position the probe electrode represents one side of the running clearance gap. The tip surface of a turbine blade, at electrical ground potential is gainfully employed as an opposite capacitor electrode, and the other side of the running clearance gap. A change in the clearance gap is a change in the distance between capacitor electrodes and a change in electrical capacitance therebetween. A variance or change in electrical capacitance, by an increase or decrease in the clearance gap from a predetermined value is measured and correlated by appropriate electrical circuitry to indicate the dimensional change in the distance between the tip surface of a turbine blade, and the closely encircling housing represented by the probe electrode.

As previously described, the probe member, and particularly the sensor electrode part thereof, is positioned in a very hostle environment of high temperatures in the presence of contaminating hot combustion gases from the combustion system of the engine, conditions which contribute to early probe deterioration resulting in, for example, a decrease in sensitivity and accuracy. As a consequence, continuing efforts are expended to provide electrical capacitance probes which are more highly resistant to temperature extremes and contamination, and which have increased sensitivity, accuracy and stability.

OBJECTS OF THE INVENTION

It is an object of this invention to provide an improved high temperature and contamination resistant capacitance probe.

It is another object of this invention to provide an improved high sensitivity and electrically stable capacitance probe together with an improved electrical capacitance measuring clearanceometer system.

It is a further object of this invention to provide an electrical capacitance clearanceometer probe utilizing an improved braze sealed sensor unit to prevent egress of contaminants therein, and selective metals and ceramics in the sensor unit for high temperature stability.

SUMMARY OF THE INVENTION

An improved electrical capacitance measuring system probe member is disclosed which is particularly adapted to be inserted in the casing of an aircraft gas turbine engine with a braze sealed sensor end thereof being closely adjacent passing turbine blade tips of a turbine wheel. The sensor end of the probe comprises a braze sealed combination of materials found to be of superior gas turbine heat and corrosion resistant characteristics together with temperature characteristics complementarily matched to each other. In a preferred embodiment, the braze sealed sensor end of the probe includes a metal-ceramic composite structure with a particular platinum alloy capacitor sensor electrode strip braze bonded to a ceramic support and oriented with the noted turbine blade tip periphery. A coaxial electrical cable passing into the probe is utilized to electrically interconnect and integrate the probe sensor electrode strip and an electrical capacitance measuring system circuit. The overall combination provides a highly accurate and stable probe sensor for an electrical capacitance measuring system. A voltage controlled, automatically correcting, frequency modulated, high frequency electrical oscillator is connected to the probe sensor electrode and the probe sensors resonant frequency modulated by the capacitance change between the probe electrode, which is electrically energized from the oscillator, and a passing and opposite spaced blade tip at electrical ground potential. The modulated signal is passed through an appropriate phase detection electrical circuit to provide an electrical signal which is proportional to the distance between the probe electrode and an adjacent turbine blade tip surface.

This invention will be better understood when taken in connection with the following drawings and description.

BRIEF DESCRIPTION OF THE DRAWINGS

FIG. 1 is a schematic illustration of a capacitance probe mounted in a turbine housing.

FIG. 2 is a cross-sectional illustration of an improved probe for the application in FIG. 1.

FIG. 3 is a cross-sectional illustration of a preferred probe sensor tip of FIG. 2.

FIG. 4 is an end view of the tip of FIG. 3 taken on the line 4—4 thereof showing the capacitor electrode configuration.

FIG. 5 is a schematic block diagram of a basic electrical circuit for the probe of FIG. 2.

DESCRIPTION OF A PREFERRED EMBODIMENT OF THIS INVENTION

A schematic illustration of one capacitance probe mounting application with a probe in its operative position is shown in FIG. 1.

Referring now to FIG. 1, a hot gas turbine engine 10 comprises a housing or casing 11 closely encircling a bladed turbine wheel 12 which as adapted for rotation in housing 11 by reacting with a hot gas stream which flows axially through the row of blades 13. For the reasons given, the running clearance or gap between the blade tips or free ends and the inner surface of the housing 11 should be maintained in a proscribed range. The probe of this invention is utilized to modulate a high frequency electrical signal as a function of electrical capacitance between the ends of the turbine blades 13 and the encircling casing 11. The modulated electrical signal is suitably processed to provide an electrical signal which is proportional to the running clearance. In FIG. 1, probe 14, shown in phantom, is inserted into casing 11 through an appropriate apertured casing mounting pad or pedestal 15. The inner end of probe 14 is fitted with an electrical capacitor electrode 16 at the inner surface of casing 11. A tip of a blade 13 together with probe electrode 16 represent a pair of capacitor electrodes in spaced planar relationship separated by an air gap which is the running clearance of the turbine wheel with respect to casing 11. A preferred assembly for probe 14 is illustrated in FIG. 2.

Referring now to FIG. 2, probe 14 comprises a narrow hollow cylindrical metal body 17 having an expanded open ended hollow cylindrical head 18 concentric with one end of cylindrical body 17. Open ended head 18 includes an annular step groove 19 at its open end with a disc cover member 20 seated in groove 19. A suitable spring lock ring 21 is employed to be seated in groove 19 on cover 20 to securely fix cover 20 in groove 19. A cylindrical electrical transformer or inductor 22 is positioned coaxially in head 18 and is electrically connected to a coaxial cable 23 entering head 18 in transverse relationship, and to an electrical ground potential strap 24 on head 18. Coaxial cable 23 comprises an inner conductor 25 and a spaced surrounding metal sheath 26 which makes electrical contact with probe 14 at 27 where cable 23 enters probe 14. Preferably, the space between the central conductor 25 and surrounding sheath 26 is filled with an electrically insulating mineral filler material. A preferred material, is silicon dioxide, $SiO_2$, which is high temperature resistant to dielectric degradation and capacitance changes. Inductor 22 is preferably potted in hollow head 18 by means of a high temperature potting compound to reduce sensitivity of inductor 22 from high temperature in the immediate environment of the probe location. An important feature of this invention is the provision of a high temperature resistant inductor 22. Ordinarily, inductors are sensitive to temperature extremes which deleteriously affect their electrical function. For this reason prior probe inductors have been fitted with special cooling arrangements, including fluid cooling systems, to achieve a desirable degree of higher temperature insensitivity. Inductor 22 of this invention comprises a ceramic core structure with overwound electrical wire coils thereon. The ceramic core is a high temperature resistant ceramic material correlated to the expected high temperature. The electrical wire coils are covered with an insulation material also resistant to the expected temperatures, for example, a material such as a glass fiber material. The high temperature inductor as defined is suitably potted in probe head 18 with a high temperature potting compound, and the combination provides a high temperature resistant inductor arrangement which not only operates effectively at temperatures exceeding about 600° F., which are found in the probe environment adjacent the turbine casing, but also overcomes the prior need for special cooling systems Inner conductor 25 of cable 23 is connected to an input lead 28 of inductor 22 while an output lead (not shown) of inductor 22 is connected to a rigid central conductor wire 29 passing concentrically through probe body 17 to the probe sensor tip 30. Sensor top 30 is a most important mechanical and electrical component of probe 14, the details of which are more clearly described with respect to FIG.

Referring now to FIG. 3, probe tip 30 comprises a hollow sleeve tip 31 having a pair of successive adjacent counter bore recesses 32 and 33 at one end thereof together with their respective counter bore shoulders 34 and 35. One satisfactory material for sleeve 31 is Hastelloy X, a high temperature alloy having a nominal composition of 45% nickel, 22% chrome, 9.0% molybdenum, 0.15% carbon and the balance iron. A high temperature resistant cylindrical ceramic insulator member 36, comprising a compressed body of a metal oxide such as aluminum oxide, $Al_2O_3$ is positioned concentrically within sleeve tip 31. In one example, insulator member 36 is formed from $Al_2O_3$ as a cylindrical post body 37 with an expanded cylindrical head part 38 so that, in cross-section a generally T-shaped configuration is presented. As illustrated in FIG. 3, head part 38 fits closely in recess 32 of sleeve 31 and spaced from shoulder 34 of recess 32. The transverse planar base or exposed end 39 of insulator 36, which is the end surface opposite head 38 is axially closely adjacent the exposed transverse end surface 40 of sleeve 31. In order to join insulator 36 to sleeve tip 31 and to provide an improved temperature transition from a ceramic material such as $Al_2O_3$ insulator 36, to sleeve 31 of Hastelloy metal, a thin wall metal transition cylinder 41 is employed to be positioned concentrically in recess 32 to oppositely, (internally and externally) engage head 38 of insulator 36 and sleeve 31, respectively, to support and isolate insulator 36 from sleeve 31. Cylinder 41 is preferably formed from one of a number of platinum alloys, one example being a platinum—10% rhodium alloy which is high temperature compatible with both $Al_2O_3$ and Hastelloy metal. Cylinder 41 is brazed to each engaging surface of insulator member 36 and sleeve 31, and avoids direct metallized bonding of insulator member 36 to Hastelloy sleeved 31.

An additional advantage of air cooling may be incorporated in the tip assembly 30 of this invention. In this respect the diameter of insulator body 37 is significantly less than the inside diameter of the adjacent sleeve tip 31 to provide an annular air passage 42 therebetween. A peripheral row of spaced apart radial or lateral air entry ports 43 (only two shown) are formed in sleeve member 31 to communicate with annular passage 42. Ports 43 may be angularly directed from the horizontal as viewed in FIG. 4, towards the illustrated base end 39 of insulator 36. A capacitor or sensor electrode unit 44 of probe 14 is carried by and braze bonded to the base end 39 of insulator 36. As shown in FIGS. 3 and 4, sensor electrode unit 44 comprises a short planar generally rectangular strip 45 having a stem 46 with an open bore 47 therein projecting perpendicularly and concentrically from the plane of strip 45 to extend through a central bore of insulator 36 and emerge in the counterbores 32 and 33 of sleeve 31. As previously described with respect to FIG. 2, the central rigid conductor wire 29 which is connected to inductor 22 passes into stem 46 and is brazed therein to electrically connect sensor electrode unit 44 with inductor 22. Sensor strip electrode 45 is brazed in planar abutting relationship to the base end 39 of insulator 36 for mechanical and electrical stability. As illustrated in FIGS. 3 and 4, the ends of strip 45 are spaced inwardly from the periphery of transverse end 39 of insulator 36 and from end 40 of sleeve 31. Capacitor electrode unit 44, insulator 36, and sleeve tip 31 are cooled by a flow of air in annular passage 42. A turbine wheel may be closely encircled by an inner casing or turbine shroud such as shroud 48 of FIG. 3. Such shrouds are advantageously cooled by having a supply of air from the associated air compressor of a hot gas turbine engine pass over shroud 48 through an air space or plenum 49. This cooling air at an elevated pressure enters air ports 43 in sleeve tip 31 to flow into annular passage 42 and exit around sensor strip electrode 45. This exiting air not only cools tip assembly 30 and electrode unit 44, but also washes across sensor electrode strip 45 to assist in preventing contamination from components in the combustion gases in the vicinity of the turbine wheel. Coolant air from passage 42 is expeditiously discharged at the turbine wheel to mix with the hot gas discharge passing therethrough and is exhausted from the engine with the usual exhaust discharge. Coolant air in annular passage 42 is caused to flow unidirectionally towards strip electrode 45 because passage 42 is sealed off in the opposite direction by the thin wall transition cylinder 41 which circumferentially engages head 38 of insulator 36 and sleeve 31 and is sealingly brazed to both.

Probe tip 30 is described as a braze sealed gas tight unit, and comprises a particular combination of materials which are vacuum brazed to each other to be highly resistant to distortion and accidental disassembly at elevated temperatures, in addition to being electrically stable and sealed off from egress of hot gas contaminants penetrating to the interior of the probe where a high degree of electrical insulation integrity must be retained. In one practice of this invention insulator member 36 was formed from $Al_2O_3$, metallized by means of the well known molybdenum manganese process, and then given a nickel coating or plating. Thereafter the parts were assembled as illustrated in FIG. 3 and placed in a vacuum oven for brazing of mating surfaces. A preferred brazing material particularly for electrical components comprises a copper-gold alloy with copper predominating to as much as 60% to 75% copper. This braze sealed and bonded cylinder 41 to insulator head 38 and sleeve 31, and the periphery of electrode stem 46 as it emerges from insulator 36. The assembled and sealed probe tip 30 may be attached to probe body 17 by means of an intermediate adapter sleeve welded to tip 30 and body 17, or, tip 30 may be conveniently welded directly to body 17.

FIG. 4 is an end view of tip 30 showing strip electrode 45 as presented to the tip or end surface of a turbine blade. In operation, the base end 39 of insulator 36 is slightly set back (FIG. 3) from the exposed or free end 40 of sleeve tip 31, and the exposed surface of sensor electrode 45 is coplanar with the free end 40 of sleeve 31 but spaced therefrom. Sensor electrode strip 45 of FIG. 4 is preferably a platinum alloy and particularly oriented with respect to an opposite blade tip. In general, the longitudinal axis of strip electrode 45 is at an angle (not parallel or perpendicular) to the axis of rotation of the turbine wheel and the plane of the wheel.

A rather rudimentary electrical circuit for probe 14 of this invention comprises a source of electrical power and a high frequency oscillator to provide an electrical signal to electrode 45 of FIGS. 2, 3 and 4. Probe 14 and its inductor and connected electrode 45 constitute elements of an L.C. resonant or tuned circuit in the oscillator. The changing capacitance between the probe electrode and a passing blade tip modulates the resonant frequency of the probe output signal which is then passed through a phase detector to provide an electrical signal proportional to the running clearance as described and may be used in audio, visual, or data recording devices as a readout of the running clearance. One general example of a frequency modulated electrical circuit is found in the publication Electronics, May, 1953, page 147.

A much improved electrical circuit for the improved kind of probes described in this invention is schematically illustrated in block diagram in FIG. 5.

In FIG. 5 a voltage controlled variable frequency oscillator (VCO) 50 is connected to probe 14 and, together with an electrical power supply (not shown) provides a high frequency electrical signal to a probe 14 electrode such as electrodes 16 and 45 of the drawings as described. Changes in electrical capacitance between the probe electrode and a passing tip of a blade 13 modulate the signal phase compared to the oscillator. The modulated phase signal passes into a phase detector 51 which processes the changes in phase relative to the VCO as an electrical signal proportional to the running clearance. The phase detector signal may be processed in various electric circuitry such as a processor 52 to provide an audio, visual, or recorded readout. The use of a VCO oscillator in which the signal frequency is continuously and readily voltage controlled in an analog manner as opposed to a digital manner permits expeditious use of an electrical feedback or correction circuit represented schematically as 53 which is electrically associated with phase detector 51 as well as oscillator 50. After initial tuning of the oscillator, the frequency output signal may vary or drift because of temperature changes which affect different electrical components, particular capacitor structures in the electrical measuring system, and change the steady state capacitance of the system. An electrical correction circuit 53 senses the drift in the operating point frequency of the oscillator, which is expeditiously sensed in the phase detector and provides a correcting electrical signal to the voltage controlled oscillator 50 to adjust its output frequency to a slightly different frequency to bring the system closer to an optimum operating point.

A phase detector 51 is employed to provide a measuring system based on phase detection rather than other forms of detection including, for example, amplitude detection.

In a practice of this invention, a voltage tunable oscillator of 30-40 MHZ frequency output was utilized together with the automatic error signal feedback circuit as described. The measuring system provided excellent results and displayed good insensitivity to oscillator amplitude output variations, engine electrical noise, and cable 23 (FIG. 2) distortions and vibrations. A particular advantage of probe 14 and its circuit as described is the ability to sense both metallic and non-metallic turbine or compressor blades. With a minimum running clearance a blade tip passes very closely to the probe electrode 45. However, electrode 45 is spaced from tip 40 of sleeve 31 and an electrical capacitor field relationship is established therebetween. The very close presence of a non-metallic blade tip in this region, which involves a blade tip of a dielectric material having a dielectric constant significantly different from the dielectric constant of the usual gas in the running clearance gap, is sufficient to exert an electrical capacitance change which is sensed by the probe and electrical circuit to provide a signal representative of the closeness of the non-metallic blade tip to the probe, i.e. running clearance.

This invention may be applied to various rotary apparatus having running clearances including bladed turbine wheels and compressor rotors or impellers, and other rotary members having an interrupted periphery surface in closely confining housings or casings where contact measuring devices may be inappropriate.

While this preferred invention has been disclosed and described with respect to preferred embodiments thereof, it will be understood by those skilled in the art that various changes and modifications may be made therein without departing from the spirit and scope of the invention as set forth in the appended claims.

What is claimed:
1. In a capacitance measuring system for measuring the clearance between a housing and a moving member within and closely adjacent said housing, an improved capacitance probe therefore comprising in combination
 (a) a narrow cylindrical metal probe body having a hollow head at one end and adapted for insertion into said housing to have an opposite end thereof adjacent said moving member,
 (b) a high temperature electrical inductor in said hollow head,
 (c) a sensor tip assembly on the said opposite end of said probe adjacent said moving member, said sensor tip comprising,
   (1) a hollow metal sleeve tip,
   (2) a cylindrical ceramic electrically insulating insert member with a planar end surface in said sleeve tip with said planar end surface adjacent said moving member,
   (3) a narrow rectangular planar capacitor electrode braze bonded to said insert planar surface in planar abutting relationship,
   (4) an electrical conductor in said probe electrically interconnecting said inductor and said capacitor electrode,
   (5) a transition metal cylinder positioned between said ceramic member and said sleeve tip to support and isolate said insert from said sleeve tip and braze bonded to each.

2. The invention as recited in claim 1 wherein the diameter of said insert is less than a diameter of said sleeve tip to define an annular air flow passage, said sleeve tip having peripherally spaced air ports therein in air flow communication with said annular passage.

3. The invention as recited in claim 1 wherein each of said capacitor electrode and said metal transition member comprises a platinum alloy, and said sleeve tip is an alloy comprising principally iron, nickel, chromium, and molybdenum.

4. The invention as claimed in claim 1 wherein an electrical coaxial cable comprising an inner central conductor and an outer spaced metal sheath is connected transversely into said probe with its metal sheath electrically connected to said probe body and its central conductor therein connected to said inductor to provide an electrical signal thereto.

5. The invention as recited in claim 1 wherein said high temperature inductor is stabilized in said probe with a high temperature potting compound.

6. The invention as recited in claim 1 wherein said capacitor electrode comprises a narrow rectangular metal strip radially inwardly spaced from said sleeve tip.

7. The invention as recited in claim 4 wherein an electrically insulating mineral filler fills the space between said central conductor and said sheath of said cable to maintain concentricity of said inner conductor and constant low electrical capacitance therebetween.

8. The invention as recited in claim 4 wherein a voltage controlled continuously variable high frequency oscillator is connected to said coaxial cable to provide an electrical signal to said probe with said inductor, conductor and capacitor electrode comprising an LC. resonant electrical circuit so that electrical capacitance changes between said capacitor electrode and said moving member modulate the resonant frequency of said resonant circuit.

9. The invention as recited in claim 8 wherein a phase detector is connected to said oscillator to process the said modulated signal into an electrical signal proportional to the electrical capacitance and distance between the said capacitor electrode and said moving member.

10. The invention as recited in claim 9 wherein an automatic feedback correction circuit is connected to said phase detector and said oscillator to sense a drift of the operating point frequency of said oscillator and apply a corrective voltage to said oscillator to change the signal frequency thereof.

* * * * *